(12) United States Patent
Perry et al.

(10) Patent No.: US 11,954,191 B2
(45) Date of Patent: Apr. 9, 2024

(54) SYSTEM AND METHOD FOR PERFORMING IDENTITY AUTHENTICATION BASED ON DE-IDENTIFIED DATA

(71) Applicant: DE-IDENTIFICATION LTD., Tel Aviv (IL)

(72) Inventors: Gil Perry, Tel Aviv (IL); Sella Blondheim, Tel Aviv (IL); Eliran Kuta, Tel Aviv (IL); Yoav Hacohen, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 496 days.

(21) Appl. No.: 17/273,420

(22) PCT Filed: Sep. 5, 2019

(86) PCT No.: PCT/IL2019/050993
§ 371 (c)(1),
(2) Date: Mar. 4, 2021

(87) PCT Pub. No.: WO2020/049565
PCT Pub. Date: Mar. 12, 2020

(65) Prior Publication Data
US 2021/0200851 A1 Jul. 1, 2021

Related U.S. Application Data

(60) Provisional application No. 62/727,155, filed on Sep. 5, 2018.

(51) Int. Cl.
*G06F 21/00* (2013.01)
*G06F 21/32* (2013.01)
(Continued)

(52) U.S. Cl.
CPC ............... *G06F 21/32* (2013.01); *G06N 3/08* (2013.01); *H04L 9/3231* (2013.01); *G06V 40/172* (2022.01)

(58) Field of Classification Search
CPC ....... G06F 21/32; G06F 21/6254; G06N 3/08; H04L 9/3231; G06V 40/172
See application file for complete search history.

(56) References Cited

U.S. PATENT DOCUMENTS 6,278,791 B1    8/2001   Honsinger et al.
8,270,718 B2    9/2012   Drory et al.
(Continued)

FOREIGN PATENT DOCUMENTS

EP         3451209      3/2019
JP         2009-111971   5/2009
(Continued)

OTHER PUBLICATIONS

Liang Du et al. "GARP-Face: Balancing Privacy Protection and Utility Preservation in Face De-identification" IEEE International Joint Conference on Biometrics, Clearwater, FL, 2014, pp. 1-8.
(Continued)

*Primary Examiner* — Kendall Dolly
(74) *Attorney, Agent, or Firm* — PEARL COHEN ZEDEK LATZER BARATZ LLP (57) ABSTRACT

System and method of performing identity authentication based on de-identified data, with receiving of at least one data item from a user, creating at least one de-identified data item and a corresponding authentication key, based on the received at least one data item, storing the at least one de-identified data item in a database, receiving at least one new data item for authentication, retrieving the authentication key corresponding to the user, generating at least one new de-identified data item based on the received at least
(Continued)

one new data item, and comparing the at least one new de-identified data item with the stored at least one de-identified data item to authenticate the identity of the user.

18 Claims, 4 Drawing Sheets

(51) Int. Cl.
   *G06N 3/08* (2023.01)
   *H04L 9/32* (2006.01)
   *G06V 40/16* (2022.01)

(56) References Cited

U.S. PATENT DOCUMENTS

| | | |
|---|---|---|
| 9,105,119 B2 | 8/2015 | Whitehill et al. |
| 2007/0236513 A1 | 10/2007 | Hedenstroem et al. |
| 2010/0074525 A1 | 3/2010 | Drory et al. |
| 2011/0123118 A1 | 5/2011 | Nayar et al. |
| 2012/0177248 A1 | 7/2012 | Shuster |
| 2012/0288166 A1 | 11/2012 | Sun et al. |
| 2014/0328547 A1 | 11/2014 | Whitehill et al. |
| 2015/0261995 A1 | 9/2015 | Hudgins |
| 2015/0324633 A1 | 11/2015 | Whitehill et al. |
| 2017/0301121 A1 | 10/2017 | Whitehill et al. |
| 2017/0302661 A1* | 10/2017 | Connell, II ......... H04L 63/0421 |
| 2018/0183802 A1* | 6/2018 | Choyi ................... H04L 63/205 |
| 2019/0147340 A1 | 5/2019 | Zhang et al. |
| 2019/0188562 A1 | 6/2019 | Edwards et al. |
| 2019/0238568 A1 | 8/2019 | Goswami et al. |
| 2019/0332850 A1 | 10/2019 | Sharma et al. |
| 2020/0097767 A1 | 3/2020 | Perry et al. |
| 2020/0234480 A1 | 7/2020 | Volkov et al. |
| 2020/0274708 A1* | 8/2020 | Vijayanarayanan ........................ H04L 9/0891 |
| 2023/0031087 A1* | 2/2023 | Tussy .................... H04W 12/06 |

FOREIGN PATENT DOCUMENTS

| | | | |
|---|---|---|---|
| KR | 102123248 | 6/2020 | |
| MX | 2014015326 | 3/2018 | |
| WO | WO 2015/039084 | 3/2015 | |
| WO | WO-2015039084 A1 * | 3/2015 | ............. G06F 21/32 |
| WO | WO 2015039086 | 3/2015 | |
| WO | WO 2016/107651 | 7/2016 | |
| WO | WO 2018/225061 | 12/2018 | |
| WO | WO 2019/014487 | 1/2019 | |

OTHER PUBLICATIONS

Driessen et al. "Achieving Anonymity Against Major Face Recognition Algorithms" In: De Decker B., Dittmann J., Kratzer C., Vielhauer C. (eds) Communications and Multimedia Security. CMS 2013. Lecture Notes in Computer Science, vol. 8099. pp. 18-33, Springer, Berlin, Heidelberg.
Jourabloo et al. "Attribute Preserved Face De-identification" 2015 International Conference on Biometrics (ICB), Phuket, 2015, pp. 278-285.
Meng et al. "Face De-identification for Privacy Protection" 2014 37th International Convention on Information and Communication Technology, Electronics and Microelectronics (MIPRO), Opatija, 2014, pp. 1234-1239.
Gross et al. "Face De-Identification" In: Senior A. (eds) Protecting Privacy in Video Surveillance. pp 129-146, Springer, London.
Bitouk et el. "Face Swapping: Automatically Replacing Faces in Photographs" ACM Trans. Graph. 27, 3, Aug. 2008, pp. 1-8.
Muraki et al. "Anonymizing Face Images by Using Similarity-Based Metric" 2013 International Conference on Availability, Reliability and Security, Regensburg, 2013, pp. 517-524.
Chi et al. "Facial Image De-Identification using Identity Subspace Decomposition" 2014 IEEE International Conference on Acoustics, Speech and Signal Processing (ICASSP), Florence, 2014, pp. 524-528.
Gross, Ralph, et al. "Multi-pie." Image and Vision Computing 28.5 (2010): 807-813.
Yang, Shuo, et al. "Wider face: A face detection benchmark." Proceedings of the IEEE conference on computer vision and pattern recognition. 2016.
Kingma, Diederik P., and Jimmy Lei Ba. "Adam: A Method for Stochastic Optimization." (2015). ICLR 2015.
Akhtar, Naveed, and Ajmal Mian. "Threat of adversarial attacks on deep learning in computer vision: A survey." IEEE Access 6 (2018): 14410-14430.
Carlini, Nicholas, and David Wagner. "Towards evaluating the robustness of neural networks." 2017 IEEE Symposium on Security and Privacy (SP). IEEE, 2017.
Baluja, Shumeet, and Ian Fischer. "Adversarial transformation networks: Learning to generate adversarial examples." arXiv preprint arXiv:1703.09387 (2017).
Das, Nilaksh, et al. "Keeping the bad guys out: Protecting and vaccinating deep learning with jpeg compression." arXiv preprint arXiv:1705.02900 (2017).
Le, Vuong, et al. "Interactive facial feature localization." European conference on computer vision. Springer, Berlin, Heidelberg, 2012.
Messer, Kieron, et al. "XM2VTSDB: The extended M2VTS database." Second international conference on audio and video-based biometric person authentication. vol. 964.1999.
Phillips, P. Jonathon, et al. "Overview of the face recognition grand challenge." 2005 IEEE computer society conference on computer vision and pattern recognition (CVPR'05). vol. 1. IEEE, 2005.
Dziugaite, Gintare Karolina, Zoubin Ghahramani, and Daniel M. Roy. "A study of the effect of jpg compression on adversarial images." arXiv preprint arXiv:1608.00853 (2016).
Esteva, Andre. "Dermatologist-level classification of skin cancer with deep neural networks. Enhancing the Expert." Stanford University. Slide Presentation. Jun. 8, 2017. URL: https://pdfs.semanticscholar.org/0d0e/e35c1b05868c1bc9494a202dce4b7f414370.pdf.
Schmidhuber, Jurgen. "Deep Learning in Neural Networks: An Overview." arXiv preprint arXiv: 1404.7828 (2014).
Girshick, Ross. "Fast r-cnn." Proceedings of the IEEE international conference on computer vision. 2015.
Girshick, Ross, et al. "Rich feature hierarchies for accurate object detection and semantic segmentation." Proceedings of the IEEE conference on computer vision and pattern recognition. 2014.
Deng, Jia, et al. "Imagenet: A large-scale hierarchical image database." 2009 IEEE Conference on Computer Vision and Pattern Recognition, Miami, FL, 2009, pp. 248-255.
Moosavi-Dezfooli, Seyed-Mohsen, Alhussein Fawzi, and Pascal Frossard. "Deepfool: a simple and accurate method to fool deep neural networks." Proceedings of the IEEE Conference on Computer Vision and Pattern Recognition. 2016.
Xie, Cihang, et al. "Adversarial examples for semantic segmentation and object detection." Proceedings of the IEEE International Conference on Computer Vision. 2017.
Olah, Chris, et al. "The building blocks of interpretability." Distill 3.3 (2018): e10.
Szegedy, Christian, et al. "Intriguing properties of neural networks." arXiv preprint arXiv:1312.6199 (2013).
Papernot, Nicolas, et al. "Practical black-box attacks against machine learning." Proceedings of the 2017 ACM on Asia Conference on Computer and Communications Security. ACM, 2017.
Papernot, Nicolas, et al. "The limitations of deep learning in adversarial settings." 2016 IEEE European Symposium on Security and Privacy (EuroS&P). IEEE, 2016.
Csaji, Balazs Csanad. "Approximation with artificial neural networks." Faculty of Sciences, Etvs Lornd University, Hungary 24 (2001): 48.
Belhumeur, Peter N., et al. "Localizing parts of faces using a consensus of exemplars." IEEE transactions on pattern analysis and machine intelligence 35.12 (2013): 2930-2940.
Ramanan, Deva, and Xiangxin Zhu. "Face detection, pose estimation, and landmark localization in the wild." 2012 IEEE conference on computer vision and pattern recognition. IEEE, 2012.

(56) References Cited

OTHER PUBLICATIONS

Simonyan, Karen, and Andrew Zisserman. "Very deep convolutional networks for large-scale image recognition." arXiv preprint arXiv:1409.1556 (2014).
Goodfellow, Ian J., Jonathon Shlens, and Christian Szegedy. "Explaining and harnessing adversarial examples." arXiv preprint arXiv:1412.6572 (2014).
Perez et al. "Face recognition and De-Identification in the frequency domain", Dec. 31, 2016.
Sendik "What's in a face? Metric learning for face characterization" Computer Graphics Forum, 2019.
He et al. "AttGAN: Facial Attribute Editing By Only Changing What You Want" Jul. 25, 2018.
Chi Hehua et al. "Face de identification using facial identity preserving features" Dec. 14, 2015.
International Search Report for App. No. PCT/IL2020/050907 dated Nov. 30, 2020.
European Search Report for App. No. 18813726.9 dated Feb. 8, 2021.
Newton EM, Sweeney L, Malin B. Preserving privacy by de-identifying facial images. IEEE transactions on Knowledge and Data Engineering. Jan. 10, 2005;17(2):232-43. Newton et al, Jan. 10, 2005.
European Search Report for Application No. EP20202094.7 dated Mar. 22, 2021.
Search Report for Application No. PCT/IL2020/051287 dated Mar. 25, 2021.
Search Report for Application No. PCT/IL2020/051291 dated Jan. 25, 2021.

Ren, Zhongzheng; Lee, Yong Jae; Ryoo. Learning to Anonymize Faces for Privacy Preserving Action Detection. Eprint arXiv:1803.11556, Jul. 26, 2018.
Letournel, Geoffrey; Bugeau, Aur?lie; Ta, Vinh-Thong; Domenger, Jean-Philippe. Face De-identification with Expressions Preservations. International Conference on Image Processing (ICIP) 2015, Sep. 2015.
PCT Search Report for Application No. PCT/IL2020/051286, dated Mar. 18, 2021.
Justus Thies et al. "Face2Face: Real-time Face Capture and Reenactment of RGB Videos" CVPR2016, Jul. 29, 2020.
Naruniec et. al. "High-Resolution Neural Face Swapping for Visual Effects" vol. 39 No. 4 (2020).
Hyeongwoo Kim et al. "Deep Video Portraits" ACM Transactions on Graphics (TOG) vol. 37, No. 4, May 29, 2018.
Thies et al. "Deferred Neural Rendering: Image Synthesis using Neural Textur" Apr. 28, 2019.
Thies et al. "Neural Voice Puppetry: Audio-driven Facial Reenactment" arXiv preprint arXiv:1912.05566 Dec. 11, 2019.
Fried et al. "Text-based editing of talking-head video" ACM Transactions on Graphics vol. 38 Issue 4 Article No. 68, pp. 1-14, Jul. 4, 2019.
Office Action for U.S. Appl. No. 17/223,561, dated Jun. 22, 2021.
Ha et al. "MarioNETte: Few-shot Face Reenactment Preserving Identity of Unseen Targets" arXiv:1911.08139, Nov. 19, 2019.
Garrido et al. "Automatic Face Reenactment" 10.1109/CVPR.2014.537, 2014.
International Search Report of PCT App. No. PCT/IL2019/050993 dated Nov. 27, 2019.

* cited by examiner

SYSTEM AND METHOD FOR PERFORMING IDENTITY AUTHENTICATION BASED ON DE-IDENTIFIED DATA

CROSS-REFERENCE TO RELATED APPLICATIONS

This application is a National Phase Application of PCT International Application No. PCT/IL2019/050993, International Filing Date Sep. 5, 2019, claiming the benefit of U.S. Provisional Patent Application No. 62/727,155, filed Sep. 5, 2018, which are hereby incorporated by reference.

FIELD OF THE INVENTION

The present invention generally relates to the field of computer vision and image processing. More particularly, the present invention relates to systems and methods for performing authentication based on de-identified data.

BACKGROUND OF THE INVENTION

Protected representations are defined as media objects (e.g., images, audio, or video files) that are manipulated to reduce the ability of classifiers to classify them correctly as their original class (e.g., an image of a face with a protected representation will not be recognized with the same confidence as its original identity on an identifying image that may be used to identify a person using face recognition algorithms for instance), also indicated as de-identified data. Generally, de-identified data may be created by manipulating data items with a predefined set of perturbations and/or permutations, for example applying perturbation and/or permutation on an image of a face until it is no longer recognizable by face recognition algorithms. For example, some methods allow swapping of faces, or aligning a face to a generic pose in images in order to enable publication of images while limiting the ability of identifying individuals in the published images, for instance using generative adversarial networks (GANs). In another example, two different images may be blended together until a blended image is created where it is not possible to perform identification of the person appearing in the original image.

Currently there are several methods for de-identification of images, but there is no solution to allow recognition of users based on the de-identified data. Thus, for example, an ATM machine that requires face recognition would have to store an unmodified image data of a user in order to authenticate the user's identity and may not authenticate the user's identity based on a de-identified image data.

SUMMARY

There is thus provided, in accordance with some embodiments of the invention, a method of performing identity authentication based on de-identified data, including: receiving, by a processor, at least one data item from a user, creating, by the processor, at least one de-identified data item and a corresponding authentication key, based on the received at least one data item, storing, by the processor, the at least one de-identified data item in a database coupled to the processor, receiving at least one new data item for authentication, retrieving, by the processor, the authentication key corresponding to the user, generating, by the processor, at least one new de-identified data item based on the received at least one new data item, and comparing, by the processor, the at least one new de-identified data item with the stored at least one de-identified data item to authenticate the identity of the user.

In some embodiments, the authentication key may be stored in the database. In some embodiments, the at least one new data item may be received form a user's computerized device. In some embodiments, a computerized neural network may be trained to generate authentication keys capable of modifying a received data item into a de-identified data item that corresponds to a de-identified data item of the same user. In some embodiments, the at least one computerized neural network may be trained on a data set of pairs of original data and de-identified data. In some embodiments, a key generation algorithm may be created to generate one-way authentication keys for future authentication of de-identified data, wherein the key generation algorithm is created by the at least one computerized neural network.

In some embodiments, a transformation function may be applied on the newly received data item, and the result may be sent to a comparing function in order to compare the de-identified data item with the newly received data item transformed according to the authentication key. In some embodiments, a de-identification algorithm that performs at least one of perturbation and permutation may be executed on received data items with a corresponding authentication key. In some embodiments, a recognition function may be applied on the received data items to return a probability of the data items belonging to the same identity. In some embodiments, the authentication key may be re-generated.

There is thus provided, in accordance with some embodiments of the invention, a data authentication system, including: at least one computerized device, including data items for authentication, at least one database, including de-identified data, and a processor, coupled to the at least one computerized device and to the at least one database, wherein the processor is configured to: receive at least one data item from a user, create at least one de-identified data item and a corresponding authentication key, based on the received at least one data item, store the at least one de-identified data item in a database coupled to the processor, receive at least one new data item for authentication, retrieve the authentication key corresponding to the user, generate at least one new de-identified data item based on the received at least one new data item, and compare the at least one new de-identified data item with the stored at least one de-identified data item to authenticate the identity of the user.

In some embodiments, the system may further include at least one computerized neural network, coupled to the processor, and configured to analyze the de-identified data from the at least one database. In some embodiments, the at least one computerized neural network may be configured to train a machine learning model that analyzes received data for authentication according to the authentication key. In some embodiments, the authentication key may have a predefined length corresponding to the data item it was generated for. In some embodiments, the system may further include a detector, to detect at least one data item.

In some embodiments, the system may further include an enrollment module to create the de-identified data item, and an authentication module to authenticate identity of new data items. In some embodiments, the enrollment module may include an authentication key generator and a de-identification function, configured to store at least one de-identified data item at the database. In some embodiments, the authentication module may receive the de-identified data item and corresponding authentication key from the database to carry out authentication of a newly received data item. In some embodiments, the authentication key may be re-generated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Figure 1:
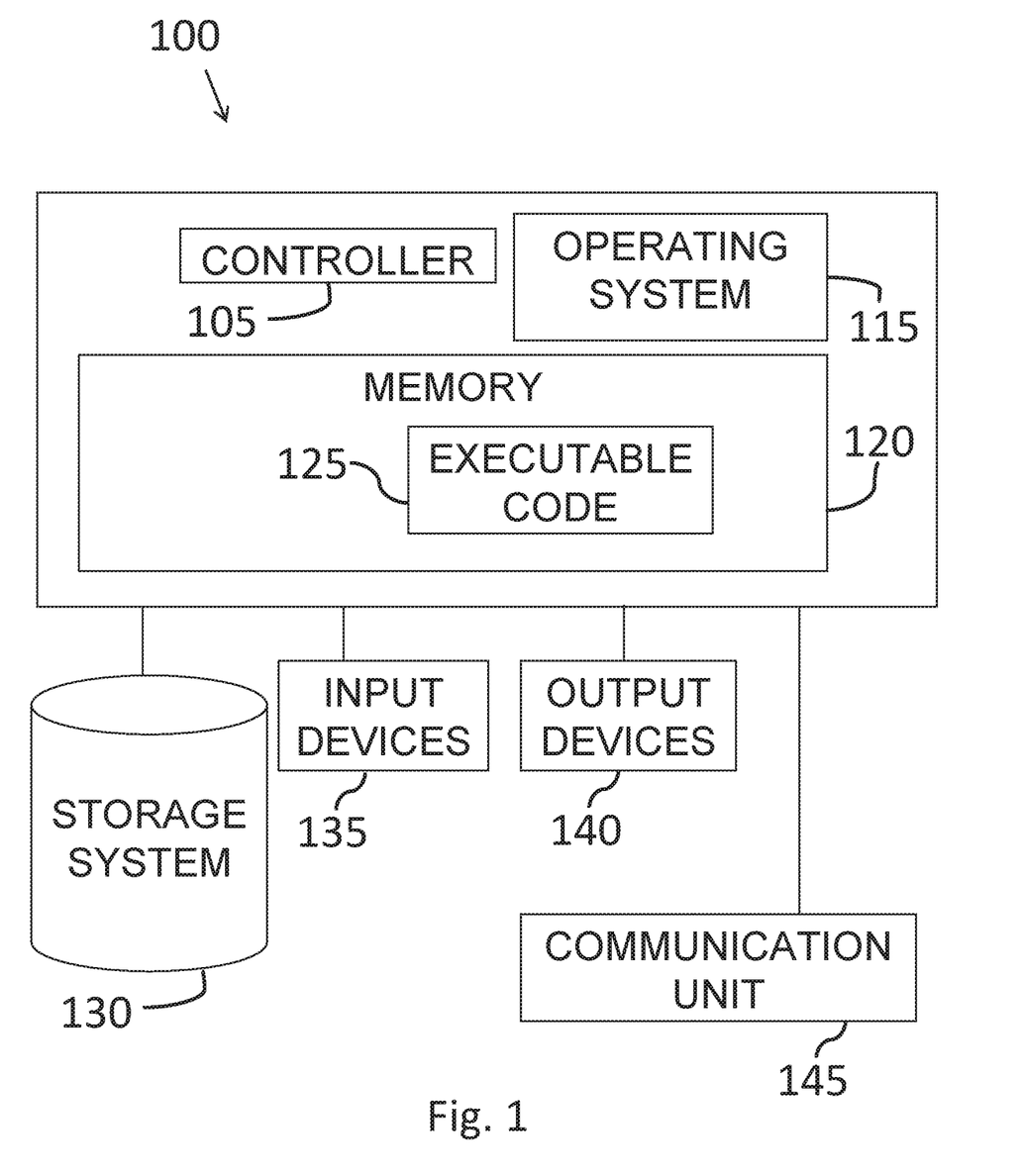
FIG. 1 shows a block diagram of an exemplary computing device, according to some embodiments of the invention.

Reference is made to FIG. 1, which is a schematic block diagram of an example of a computing device, according to some embodiments of the invention. Computing device 100 may include a controller or processor 105 (e.g., a central processing unit processor (CPU), a graphics processing unit (GPU), a chip or any suitable computing or computational device), an operating system 115, memory 120, executable code 125, storage 130, input devices 135 (e.g., a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. The controller 105 may be configured to execute program code to perform operations described herein. The system described herein may include one or more computing device(s) 100.

The operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to some embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to some embodiments of the invention may include components such as, but not limited to, a plurality of central processing units (CPU), GPUs, or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2A:
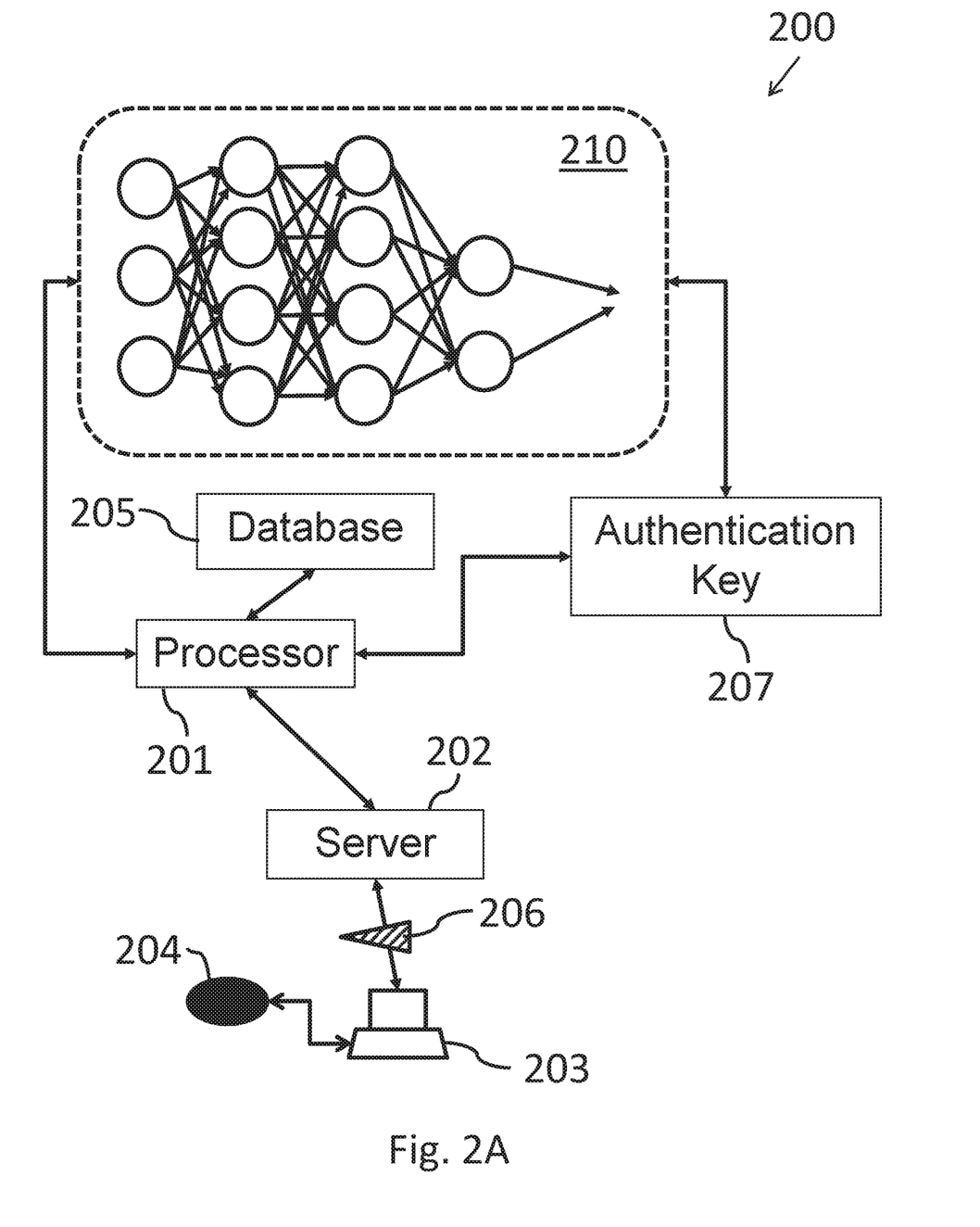
FIGS. 2A-2B show block diagrams of a data authentication system, according to some embodiments of the invention.

Reference is now made to FIG. 2A, which shows a block diagram of a data authentication system 200, according to some embodiments. Data authentication system 200 may be configured to allow authentication of identity of users based on protected representations or de-identified data. In FIG. 2A, the direction of arrows may indicate the direction of information flow.

Data authentication system 200 may include a processor 201 and/or server 202 (similar to controller 105 shown in FIG. 1), in communication with at least one computerized device 203. The at least one computerized device 203 may include a user-interface for a user of data authentication system 200. The at least one computerized device 203 may include at least one detector 204 configured to detect data for authentication, for instance an imager 204 of a mobile device 203 (e.g., a smartphone) configured to capture images of the user for authentication, or to scan a fingerprint of a user. For example, a user may use the at least one computerized device 203 (e.g., smartphone, laptop, etc.) for authentication with a dedicated device such as the processor 201 (e.g., via the server 202), where the initial data for authentication may be obtained by the at least one detector 204.

In some embodiments, the processor 201 and/or server 202 may be coupled to at least one database 205, such that data items 206 received from the at least one computerized device 203 may be authenticated with corresponding analysis of de-identified data from the at least one database 205, as further described hereinafter. In some embodiments, the processor 201 and/or server 202 may further be coupled to at least one computerized neural network 210 configured to analyze the de-identified data from the at least one database 205.

According to some embodiments, the at least one computerized neural network 210 may be configured to train a machine learning model that analyzes received data for authentication according to a dedicated authentication key 207.

In some embodiments, the algorithm for generation of the authentication key 207 may be improved during training of the at least one computerized neural network 210. The at least one computerized neural network 210 may be trained on a substantially large data set of pairs of original data and de-identified data. For example, computerized neural network 210 may receive as input a data set of image pairs (e.g., from an external source), with each pair including an original image and its corresponding de-identified image, such that the output of the computerized neural network 210 may be an optimized key generation algorithm configured to generate one-way authentication keys 207 for future authentication of de-identified data. It should be noted that the generation of the authentication keys 207 may be carried out without the possibility to invert the de-identification algorithm applied on the data (e.g., applied on images to prevent identification of users) if the authentication keys 207 do not include instructions or code to identify the identity of the user of the corresponding de-identified data, for instance the authentication keys 207 may be generated as a one-way function.

Figure 2B:
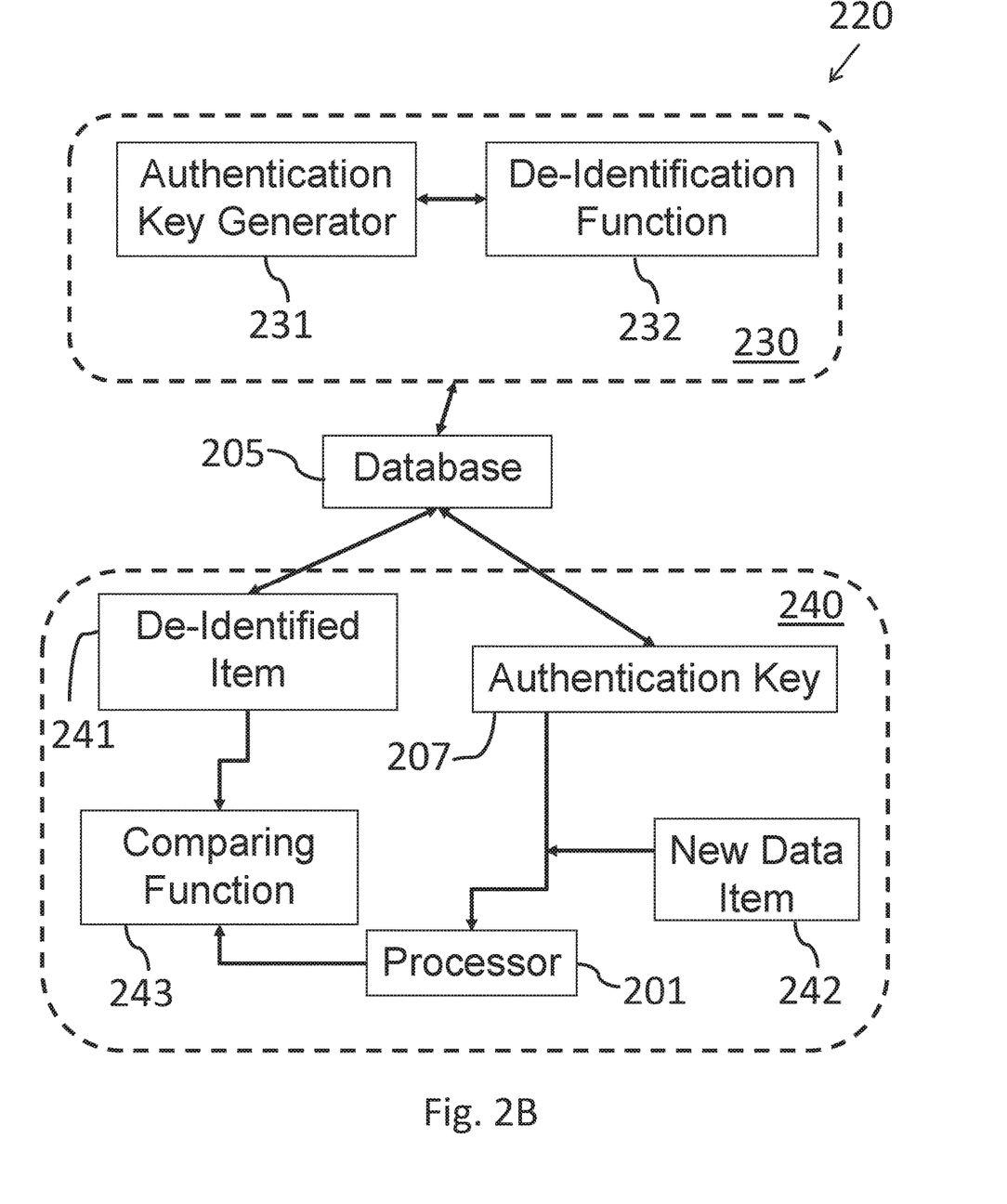

Reference is now made to FIG. 2B, which shows a block diagram of a data authentication system 220, according to some embodiments. In FIG. 2B, the direction of arrows may indicate the direction of information flow.

Data authentication system 220 may include two modules to carry out authentication of data items 206 (e.g., of a particular user), an enrollment module 230 to create the de-identified data item and an authentication module 240 to authenticate identity of new data items. The enrollment module 230 may include an authentication key generator 231 and a de-identification function 232 that are configured to store at least one de-identified data item at the database 205, for instance created by a dedicated de-identification algorithm that performs perturbations and/or permutations on received data items with a corresponding authentication key 207 that may be associated with the user.

The authentication module 240 may receive the de-identified data item 241 and corresponding authentication key 207 from the database 205 to carry out authentication of a newly received data item 242. Processor 201 may receive the authentication key 207 (associated with the user) and the newly received data item 242 to a transformation function on the newly received data item 242 and send the result to a comparing function 243 in order to compare the de-identified data item 241 with the newly received data item 242 transformed according to the authentication key 207 associated with the user. In case that the comparison is successful, the identity of the user may be authenticated.

Figure 3:
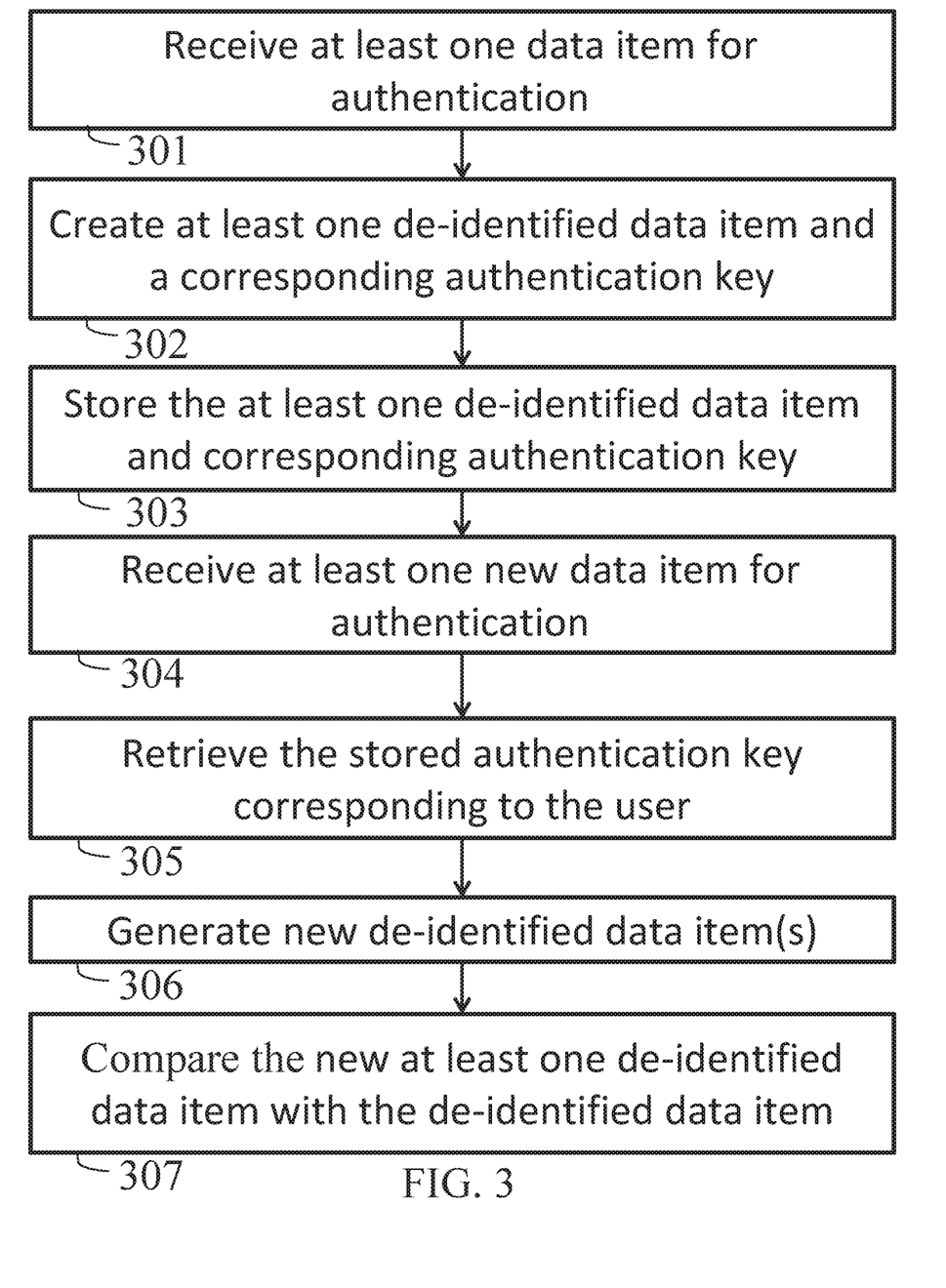
FIG. 3 shows a flowchart for a method of authenticating de-identified data, according to some embodiments of the invention.

Reference is now made to FIG. 3, which shows a flowchart for a method of authenticating de-identified data, according to some embodiments. Authentication of the de-identified data may be initiated by receiving 301 at least one data item for authentication. For example, a user of system 200 may upload via a computerized device 203 a new data item 206 for future authentication (e.g., upload a captured image of the user's face).

The processor 201 and/or the at least one computerized neural network 210 may apply a recognition function as defined in formula 1 below:

$$f: I \times I \to [0,1] \qquad \text{(eq. 1)}$$

where 'I' indicates the space of all possible data items, such that 'f' may receive a pair of data items $(x_i, x_j) \in I \times I$, and return the probability, as a number between zero and one, of the two data items 206 belonging to the same identity.

The processor 201 may accordingly create 302 at least one de-identified data item (e.g., by a dedicated de-identification algorithm that performs perturbations and/or permutations on the original data item) and a corresponding authentication key 207. For instance, processor 201 and/or the at least one computerized neural network 210 may apply a de-identification function, such as in the enrollment module 230 shown in FIG. 2B, as defined in formula 2 below:

$$r: I \to I \qquad \text{(eq. 2)}$$

that accepts any data item 'x' and returns a corresponding protected representation or de-identified data item 'r(x)', for instance 'r(x)' may be a de-identification algorithm for a given data sample (e.g., an image).

Each authentication key 207 may have a predefined length (e.g., length 'n'=1000) corresponding to the data item 206 it was generated for. In some embodiments, the created at least one de-identified data item and corresponding authentication key 207 may be stored 303 at database 205. It should be noted that the original (identifiable) data item, for example an image of the user's face, may not be stored and for instance destroyed in order to prevent any malicious attempt to use that data.

The processor 201 and/or the at least one computerized neural network 210 may apply a key generation function, such as in the enrollment module 230 shown in FIG. 2B, as defined in formula 3 below:

$$k: I \times I \to r^n \qquad \text{(eq. 3)}$$

that generates an authentication key 207 for a pair of original data item 'x' and corresponding de-identified data item 'r(x)'.

When the same user attempts to access the system 200 for authentication, for instance the user's attempting to enter the building of an organization that requires all visitors to be recognized, the processor 201 may again receive 304 at least one new data item for authentication, where the at least one new data item may be different from the previously received 301 data item 206 (e.g., receiving different images of the same user). The system 200 may retrieve 305 the stored 303 authentication key 207 corresponding to the user and accordingly generate 306 a new at least one de-identified data item that should be matchable (e.g., recognized by processor 201) to the stored 303 at least one de-identified data item. The new at least one de-identified data item may be compared 307 (e.g., with a dedicated comparing function such as in authentication module 240 shown in FIG. 2B) with the previously generated de-identified data item, such that upon successful comparison the identity of the user of the data item may be authenticated.

The processor 201 and/or the at least one computerized neural network 210 may apply a transformation function as defined in formula 4 below:

$$p: I \times r^n \to I \qquad \text{(eq. 4)}$$

that receives new data items 'x' and corresponding authentication keys 'k', such that $$f(r(x_i), p(x_j, k_{x_j})) \approx f(x_i, x_j). \qquad \text{(eq. 5)}$$

In some embodiments, the score of the recognition function 'f', given the correct authentication key, may be maintained by the at least one computerized neural network 210 and thereby allowing authentication of new data items where the only input is the new data item for a particular user and the corresponding key.

In some embodiments, only the de-identified data items and/or corresponding authentication keys are stored, such that there is no need to access the de-identification algorithm in order to perform authentication of newly received data items. In some embodiments, only the de-identified data items may be stored by system 200, and the corresponding authentication keys may be provided by the user during the authentication process (e.g., the user may carry the key on a portable storage device).

According to some embodiments, the at least one computerized neural network 210 (e.g., deep neural network) may train a machine learning algorithm to achieve optimal results, for instance where the transformation function 'p' may be trained together with the key generation function 'k'. In some embodiments, the at least one computerized neural network 210 may be trained on a dataset of data item pairs (e.g., pairs of face images), including both pairs for the same identity as well as pairs for different identities. In order to achieve the optimal results, the loss function for training the key generation function 'k' and the transformation function 'p' may include:

$$d_1(f(r(x_i), p(x_j, k_{x_j})), f(x_i, x_j)) \qquad \text{(eq. 6)}$$

where d1 is a machine learning function such as a regularization function, a cross entropy function and the like.

According to some embodiments, the de-identification function 'r' (e.g., a vector) may not be invertible, for instance given a specific key generation function 'k', as defined in formula 7 below:

$$r = -d_2(s(r(x)), x, k_x) \qquad \text{(eq. 7)}$$

where 's' may be trained together with the 'p' and 'k' functions in order to minimize $d_2(s(r(x)), x)$, and $d_2$ is also a function (e.g., $L_2$, $L_1$, cross entropy, etc.). The goal of 's' may be to reconstruct the original data item given the appropriate authentication key, such that training with the 'p', 'k' functions against it makes it hard (e.g., requiring additional tools, such as automated brute force tools, to bypass) to invert the de-identification function 'r' given 'k'.

In some embodiments, the at least one computerized neural network 210 may be trained to also identify human similarity (e.g., as perceived by a human observer) between the transformation function 'p' and the de-identification function 'r', for instance when face images are involved.

In some embodiments, at least one authentication key 207 may be re-generated with a different content, for instance at a request of the user (e.g., in case of a data leak). In some embodiments, at least one authentication key 207 may be re-generated for specific users, for instance in a predetermined time period, similarly to changing a password (e.g., every six months).

It should be noted that, while face images are given as examples above, the same authentication method may apply to any other data item (e.g., video audio, etc.) as well.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of performing identity authentication based on de-identified data, the method comprising:
   receiving, by a processor, a data item from a user;
   creating, by the processor, a de-identified data item by applying a de-identification function r on the data item,
   training, by the processor, a transformation function p and a key generation function with a loss function of $d_1(f(r(x_i), (p(x_j, k_{x_i})), f(x_i, x_j))$, where $(x_i, x_j)$ are a pair of training data items, $d_1$, is a machine learning function, and f is a recognition function;
   generating, by the processor, using the key generation function, an authentication key, based on the received data item and the de-identified data item;
   receiving a new data item for authentication;
   generating, by the processor, a new de-identified data item by applying the transformation function on the new data item and the authentication key; and
   comparing, by the processor, the new de-identified data item with the de-identified data item to authenticate the identity of the user.

2. The method of claim 1, further comprising storing the authentication key in the database.

3. The method of claim 1, wherein the new data item is received form a user's computerized device.

4. The method of claim 1, further comprising training a computerized neural network to generate authentication keys capable of modifying a received data item into a de-identified data item that corresponds to a de-identified data item of the same user.

5. The method of claim 4, wherein the computerized neural network is trained on a data set of pairs of original data and de-identified data.

6. The method of claim 4, further comprising creating a key generation algorithm configured to generate one-way authentication keys for future authentication of de-identified data, wherein the key generation algorithm is created by the computerized neural network.

7. The method of claim 1, further comprising executing a de-identification algorithm that performs at least one of perturbation and permutation on received data items with a corresponding authentication key.

8. The method of claim 7, further comprising applying, by the processor, a recognition function on the received data items to return a probability of the data items belonging to the same identity.

9. The method of claim 1, further comprising re-generating the authentication key.

10. The method of claim 1, wherein the data item is an image of a face of a user.

11. A data authentication system comprising:
    a computerized device, comprising data items for authentication;
    a database, comprising de-identified data, and
    a processor, coupled to the computerized device and to the database, wherein the processor is configured to:
    receive a data item from a user;
    create a de-identified data item by applying a de-identification function r on the data item,
    training, by the processor, a transformation function p and a key generation function with a loss function of $d_1(f(r(x_i), (p(x_j, k_{x_i})), f(x_i, x_j))$, where $(x_i, x_j)$ are a pair of training data items, $d_1$, is a machine learning function, and f is a recognition function;
    generating, by the processor, using the key generation function, an authentication key, based on the received data item and the de-identified data item;
    receive a new data item for authentication;
    generate a new de-identified data item by applying the transformation function on the new data item and the authentication key; and
    compare the new de-identified data item with the de-identified data item to authenticate the identity of the user.

12. The system of claim 11, further comprising at least one computerized neural network, coupled to the processor, and configured to analyze the de-identified data from the database.

13. The system of claim 11, wherein the authentication key has a predefined length corresponding to the data item it was generated for.

14. The system of claim 11, further comprising a detector, to detect at least one data item.

15. The system of claim 11, further comprising:
    an enrollment module to create the de-identified data item; and
    an authentication module to authenticate identity of new data items.

16. The system of claim 15, wherein the enrollment module comprises an authentication key generator and a de-identification function, configured to store at least one de-identified data item at the database.

17. The system of claim 15, wherein the authentication module receives the de-identified data item and corresponding authentication key from the database to carry out authentication of a newly received data item.

18. The system of claim 11, wherein the authentication key is re-generated.

* * * * *